United States Patent
Watanabe et al.

(10) Patent No.: US 11,534,928 B2
(45) Date of Patent: Dec. 27, 2022

(54) SUCTION APPARATUS

(71) Applicant: ISHIDA CO., LTD., Kyoto (JP)

(72) Inventors: Kousuke Watanabe, Ritto (JP); Daisuke Kudo, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 173 days.

(21) Appl. No.: 16/813,683

(22) Filed: Mar. 9, 2020

(65) Prior Publication Data

US 2020/0290214 A1    Sep. 17, 2020

(30) Foreign Application Priority Data

Mar. 12, 2019 (JP) .............................. JP2019-044582

(51) Int. Cl.
    *B25J 15/06*        (2006.01)
    *B25J 9/16*          (2006.01)
    (Continued)

(52) U.S. Cl.
    CPC ......... *B25J 15/0616* (2013.01); *B25J 9/1612* (2013.01); *B25J 9/1674* (2013.01);
    (Continued)

(58) Field of Classification Search
    CPC ............... B25J 15/0616; B25J 15/0675; B25J 9/1612; B25J 9/1674; B25J 13/08; B25J 19/02;
    (Continued)

(56) References Cited

U.S. PATENT DOCUMENTS 5,481,482 A    1/1996    Nagai et al.
6,817,639 B2 *  11/2004  Schmalz ................ B65G 47/91
                                                            294/185
(Continued)

FOREIGN PATENT DOCUMENTS

CN        1180992 A      5/1998
CN      102143681 A      8/2011
(Continued)

OTHER PUBLICATIONS

English translation of JP-2003133791 which was listed on applicant's IDS dated Oct. 14, 2020 (Year: 2003).*
(Continued)

*Primary Examiner* — Dean J Kramer
(74) *Attorney, Agent, or Firm* — Shinjyu Global IP

(57) ABSTRACT

A suction apparatus includes a suction unit, a negative pressure detection unit, a suction abnormality determination unit, and a notification unit. The suction unit suctions and holds merchandise with a negative pressure. The negative pressure detection unit detects a negative pressure value in the suction unit whenever the suction unit suctions the merchandise. The suction abnormality determination unit determines that the suction unit is abnormal in a case where the detected negative pressure value is lower in negative pressure degree than a predetermined suction determination negative pressure value continuously by a predetermined number of times of determination or more. The notification unit provides a notification in a case where the suction unit is determined to be abnormal.

5 Claims, 4 Drawing Sheets

(51) Int. Cl.
   *B25J 19/02* (2006.01)
   *B65G 47/91* (2006.01)
   *B65B 35/18* (2006.01)

(52) U.S. Cl.
   CPC .............. *B25J 19/02* (2013.01); *B65B 35/18* (2013.01); *B65G 47/91* (2013.01)

(58) Field of Classification Search
   CPC .............. B66C 1/0218; B66C 1/0237; B66C 1/0243; B66C 1/025; B65G 47/917; B65G 47/918; B65B 35/18
   USPC .................................................. 294/185, 188
   See application file for complete search history.

(56) References Cited

U.S. PATENT DOCUMENTS 7,263,890 B2 * 9/2007 Takahashi ............ B25J 15/0616
                                                                                                                                       73/700
   7,677,622 B2 * 3/2010 Dunkmann .......... B65G 47/917
                                                                                                                                       294/65
   8,678,776 B2 * 3/2014 Medow ................ B25J 15/0625
                                                                                                                                       417/53
   9,205,558 B1 * 12/2015 Zevenbergen ......... B25J 9/1633
   9,346,169 B2 * 5/2016 Burns .................. B25J 15/0616
   9,656,813 B2 * 5/2017 Dunkmann .......... B65G 47/917

FOREIGN PATENT DOCUMENTS

| | | |
   |---|---|---|
   | CN | 103096705 A | 5/2013 |
   | CN | 104932491 A | 9/2015 |
   | CN | 106660212 A | 5/2017 |
   | DE | 4229833 A1 | 3/1993 |
   | JP | H10-117098 A | 5/1998 |
   | JP | 3358464 B2 * 12/2002 ........... H05K 13/041 |
   | JP | 2003-133791 A | 5/2003 |
   | JP | 2005-314006 A | 11/2005 |
   | JP | 2013-098414 A | 5/2013 |
   | JP | 6374993 B2 | 8/2018 |

OTHER PUBLICATIONS

The Search Report from the corresponding European Patent Application No. 20161865.9 dated Sep.-Mar. 2020.

* cited by examiner

SUCTION APPARATUS

CROSS-REFERENCE TO RELATED APPLICATIONS

This application claims priority to Japanese Patent Application No. 2019-044582, filed on Mar. 12, 2019. The contents of that application are incorporated by reference herein in their entirety.

TECHNICAL FIELD

The present disclosure relates to a suction apparatus.

BACKGROUND ART

For example, an apparatus, which boxes merchandise conveyed by a conveyor, is described in Japanese Unexamined Patent Publication No. 2005-314006. The apparatus includes a suction unit that suctions and holds the merchandise with a negative pressure, and moves the merchandise into a box from the conveyor by suctioning and holding the merchandise with the suction unit.

BRIEF SUMMARY

As in the above apparatus, in a case where the suction unit, which suctions and holds the merchandise with the negative pressure, is used, for example, the merchandise may not be appropriately suctioned and held due to an abnormality, such as degradation of the suction unit. For this reason, although it is necessary to check the abnormality, such as the degradation of the suction unit, there is a case where it is difficult to determine a problem visually.

For this reason, in the present technical field, suction apparatuses, which can determine the abnormality of the suction unit appropriately, have been required.

A suction apparatus related to one aspect of the present disclosure includes a suction unit that suctions and holds merchandise with a negative pressure; a negative pressure detection unit that detects a negative pressure value in the suction unit whenever the suction unit suctions the merchandise; a suction abnormality determination unit that determines that the suction unit is abnormal in a case where the detected negative pressure value is lower in negative pressure degree than a predetermined suction determination negative pressure value continuously by a predetermined number of times of determination or more; and a notification unit that provides a notification in a case where the suction unit is determined to be abnormal.

Here, if an abnormality, such as degradation, occurs in the suction unit, the suction unit cannot be appropriately brought into close contact with the merchandise, and the negative pressure degree in the suction unit does not become high due to leakage of air. For this reason, the suction apparatus according to the aspect of the present disclosure can determine the presence/absence of the abnormality of the suction unit by using the detection result of the negative pressure detection unit. Additionally, the suction abnormality determination unit determines that the suction unit is abnormal in a case where the detected negative pressure value is lower in negative pressure degree than the suction determination negative pressure value continuously by a predetermined number of times of determination or more. Accordingly, the suction abnormality determination unit can suppress that the suction unit is erroneously determined to be abnormal in a case where the suction unit cannot suction the merchandise appropriately by chance due to causes other than the abnormality of the suction unit. In this way, the suction apparatus can appropriately determine the abnormality of the suction unit. Also, an operator of the suction apparatus can ascertain the abnormality of the suction unit on the basis of the notification by the notification unit.

The suction apparatus further includes a suction control unit that controls an operation of suctioning and holding the merchandise in the suction unit, a plurality of the suction units can be provided, the negative pressure detection unit detects the negative pressure values in the plurality of suction units, respectively, the suction abnormality determination unit determines the presence/absence of an abnormality for each of the plurality of suction units, and the suction control unit stops the suctioning and holding operation in the suction unit in a case where the number of the suction units that are determined to be abnormal by the suction abnormality determination unit is equal to or more than a predetermined number of times of abnormality determination.

Accordingly, the suction apparatus can stop the suctioning and holding operation in a case where the number of the suction units, which are determined to be abnormal, is equal to or more than the number of abnormality determinations and the merchandise cannot be appropriately suctioned and held by the suction units. Therefore, the suction apparatus can previously prevent problems caused by the fact that the merchandise cannot be appropriately suctioned and held by the suction units.

The suction apparatus further includes a blocking determination unit that determines the presence/absence of a supply blocking of a negative pressure for suctioning and holding the merchandise with the suction unit, the negative pressure detection unit detects the negative pressure value in a non-suctioned state of the merchandise in the suction unit in a state where a negative pressure source connected to the suction unit generates the negative pressure for suctioning and holding the merchandise and the suction unit does not suction the merchandise, the blocking determination unit determines that the supply blocking of the negative pressure is present in a case where the detected negative pressure value in a non-suctioned state of the merchandise is higher in negative pressure degree than a predetermined blocking determination negative pressure value, and the notification unit provides a notification in a case where the supply blocking of the negative pressure is determined to be present.

Accordingly, the suction apparatus can determine the supply blocking of the negative pressure by using the detection result of the negative pressure detection unit. Also, the operator of the suction apparatus can ascertain the supply blocking of the negative pressure on the basis of the notification by the notification unit.

According to the aspect of the present disclosure, the abnormality of the suction unit can be appropriately determined.

DETAILED DESCRIPTION

Figure 1:
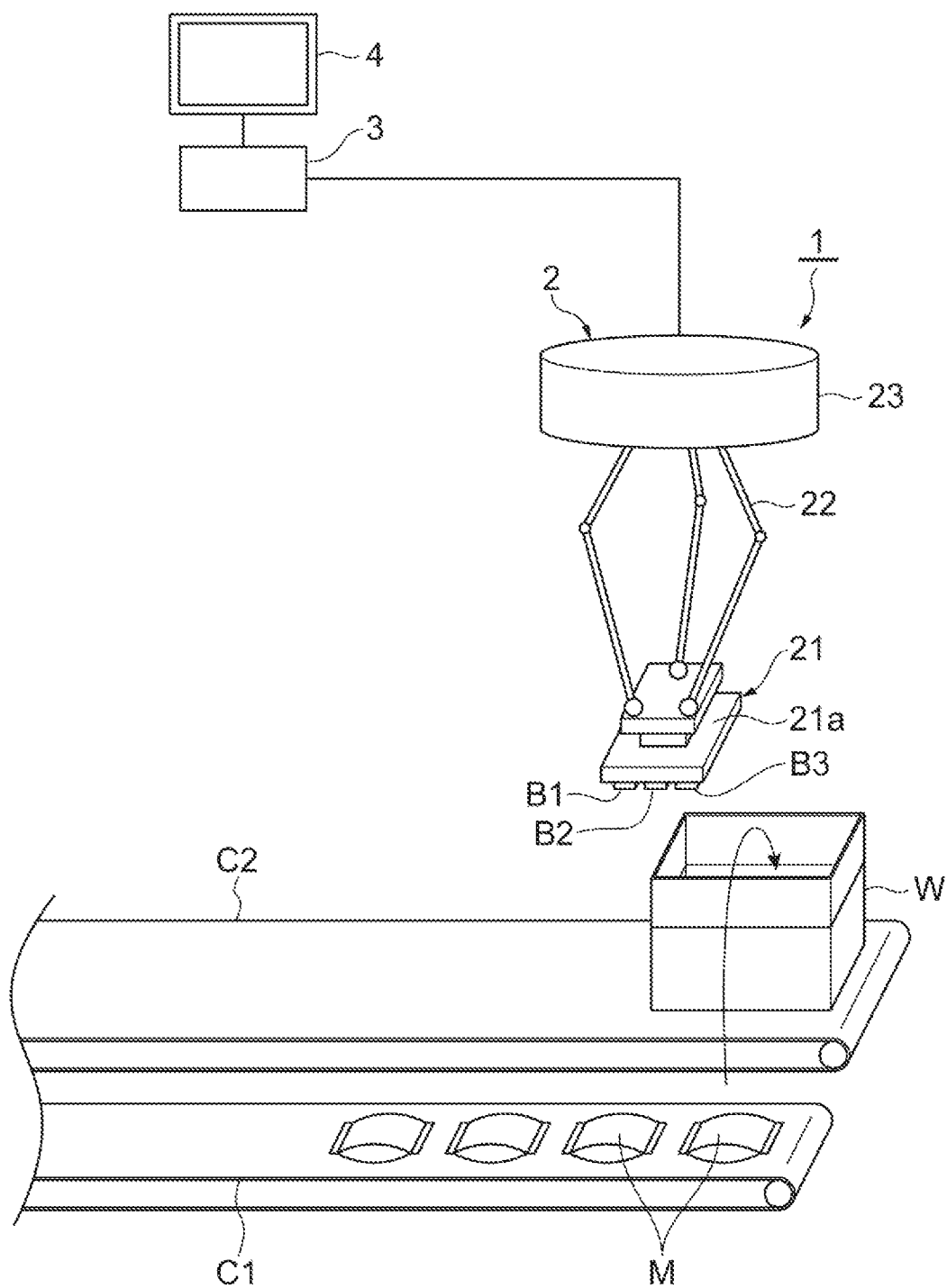
FIG. 1 is a view illustrating a schematic configuration of a boxing apparatus according to an embodiment.

Hereinafter, an embodiment of a boxing apparatus to which a suction apparatus according to the present disclosure is applied will be described referring to the drawings. In addition, in the following description, the same or equivalent elements will be denoted by the same reference numerals, and duplicate description will be omitted.

As illustrated in FIG. 1, a boxing apparatus (suction apparatus) 1 is an apparatus that suctions and holds merchandise M (for example, packaged products) sequentially conveyed by a merchandise conveyor C1 and packs the merchandise M into the inside of a box W placed on a box conveyor C2. For example, if a predetermined number of pieces of the merchandise M are packed into the box W by the boxing apparatus 1, the box conveyor C2 conveys out the box W that accommodates the merchandise M. The boxing apparatus 1 includes a transfer mechanism 2, a control unit 3, and a monitor 4.

The transfer mechanism 2 performs the operation of packing the merchandise M into the box W. The transfer mechanism 2 is constituted of, for example, a parallel link robot, and is fixed to a frame or the like provided above the merchandise conveyor C1 and the box conveyor C2. The transfer mechanism 2 includes a transfer head 21, arms 22, and a servo mechanism 23.

The servo mechanism 23 moves and rotates the transfer head 21 three-dimensionally via the arms 22. As the configuration of the arms 22 and the servo mechanism 23 for moving and rotating the transfer head 21, various well-known configurations can be used.

Figure 2:
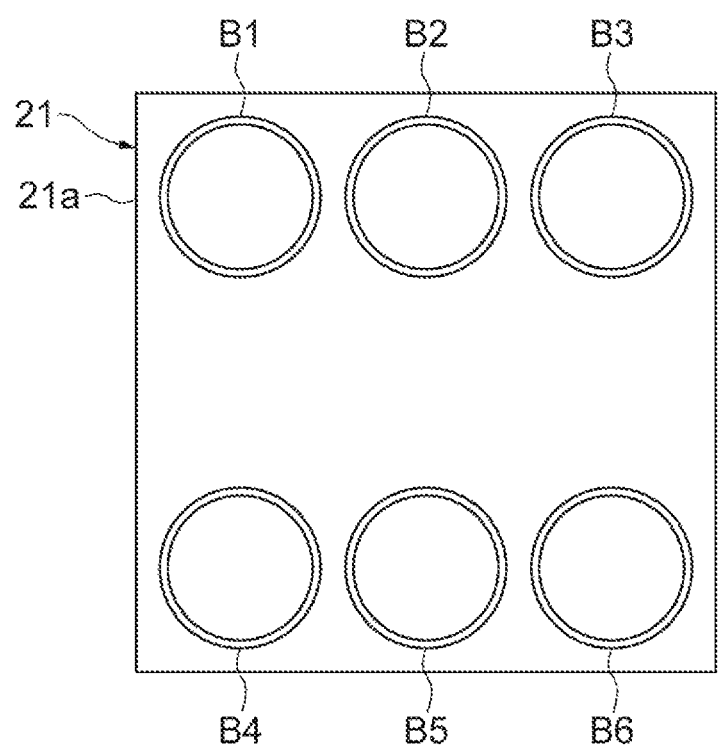
FIG. 2 is a bottom view of a transfer head of FIG. 1.
Figure 3:
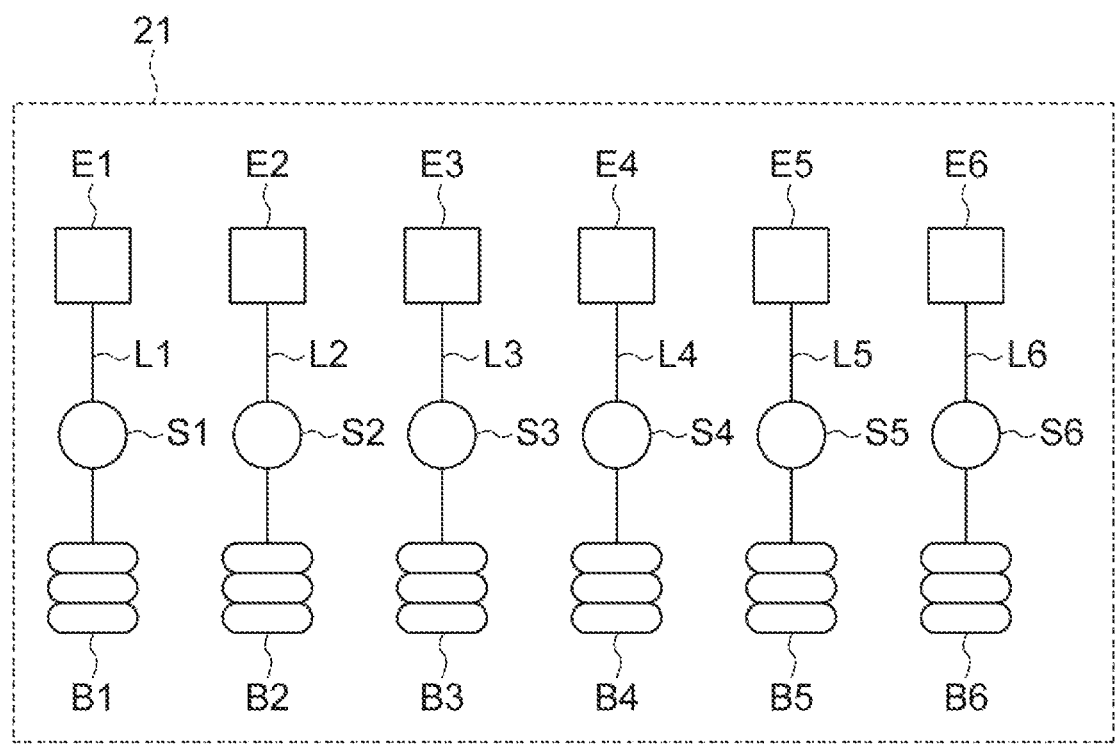
FIG. 3 is a schematic view illustrating a negative pressure piping system.

As illustrated in FIGS. 1 to 3, the transfer head 21 includes suction units B1 to B6, negative pressure sensors (negative pressure detection units) S1 to S6, and negative pressure sources E1 to E6. The suction units B1 to B6 are provided on a lower surface of a head body part 21a of the transfer head 21. In addition, the arrangement of the suction units B1 to B6 is not limited to the arrangement illustrated in FIG. 2.

The suction unit B1 suctions and holds the merchandise M with a negative pressure. In the present embodiment, the suction unit B1 is, for example, an elastically deformable, substantially tubular member. One end part of the suction unit B1 is connected to the negative pressure source E1. The other end part of the suction unit B1 is pressed against the surface of the merchandise M as the servo mechanism 23 operates the arms 22. For example, as the negative pressure source E1 generates a negative pressure in a state where the other end part of the suction unit B1 is pressed against the merchandise M, the suction unit B1 can suction and hold the merchandise M. That is, the other end part of the suction unit B1 serves as a suction port for suctioning the merchandise M. The configurations of the suction units B2 to B6 are the same as the configuration of the suction unit B1.

As illustrated in FIG. 3, the negative pressure source E1 is connected to the other end part of the suction unit B1 via a negative pressure pipe L1. The negative pressure source E1 generates the negative pressure for allowing the suction units B1 to suction and hold the merchandise M. The negative pressure source E1 can be, for example, an ejector that generates a negative pressure, using compressed air.

The negative pressure sensor S1 is provided in the negative pressure pipe L1. The negative pressure sensor S1 detects a negative pressure value in the suction unit B1 whenever the suction unit B1 suctions the merchandise M. The negative pressure value in the suction unit B1 can be a negative pressure value detected at the position of the suction unit B1 or can be a negative pressure value within a pipe that communicates with the suction unit B1. In the present embodiment, the negative pressure sensor S1 detects the negative pressure value within the negative pressure pipe L1 as the negative pressure value in the suction unit B1. The negative pressure value detected by the negative pressure sensor S1 is input to the control unit 3.

Similarly to the negative pressure source E1, the negative pressure sources E2 to E6 are connected to the suction units B2 to B6 via negative pressure pipes L2 to L6, respectively. Similarly to the negative pressure sensor S1, the negative pressure sensors S2 to S6 are also provided in the negative pressure pipes L2 to L6, respectively to detect negative pressure values in the suction units B2 to B6, respectively. In addition, the negative pressure sensors S1 to S6 and the negative pressure sources E1 to E6 can be provided in the head body part 21a or can be provided in the vicinity of the servo mechanism 23, or the like.

The monitor 4 presents various kinds of information to an operator of the boxing apparatus 1. The monitor 4 is provided in a spot that is visually recognizable by the operator. The monitor 4 can be a touch panel capable of receiving an input operation by the operator.

The control unit 3 controls the operation of the transfer mechanism 2. Additionally, the control unit 3 determines whether or not the suction units B1 to B6 are abnormal. The control unit 3 is, for example, an electronic control unit having a central processing unit [CPU], a read-only memory [ROM], a random access memory [RAM], a communication device, and the like. The control unit 3 controls hardware on the basis of a signal output from the CPU and realizes various kinds of control. In addition, the position where the control unit 3 is provided is not particularly limited and is provided at an appropriate position.

Figure 4:
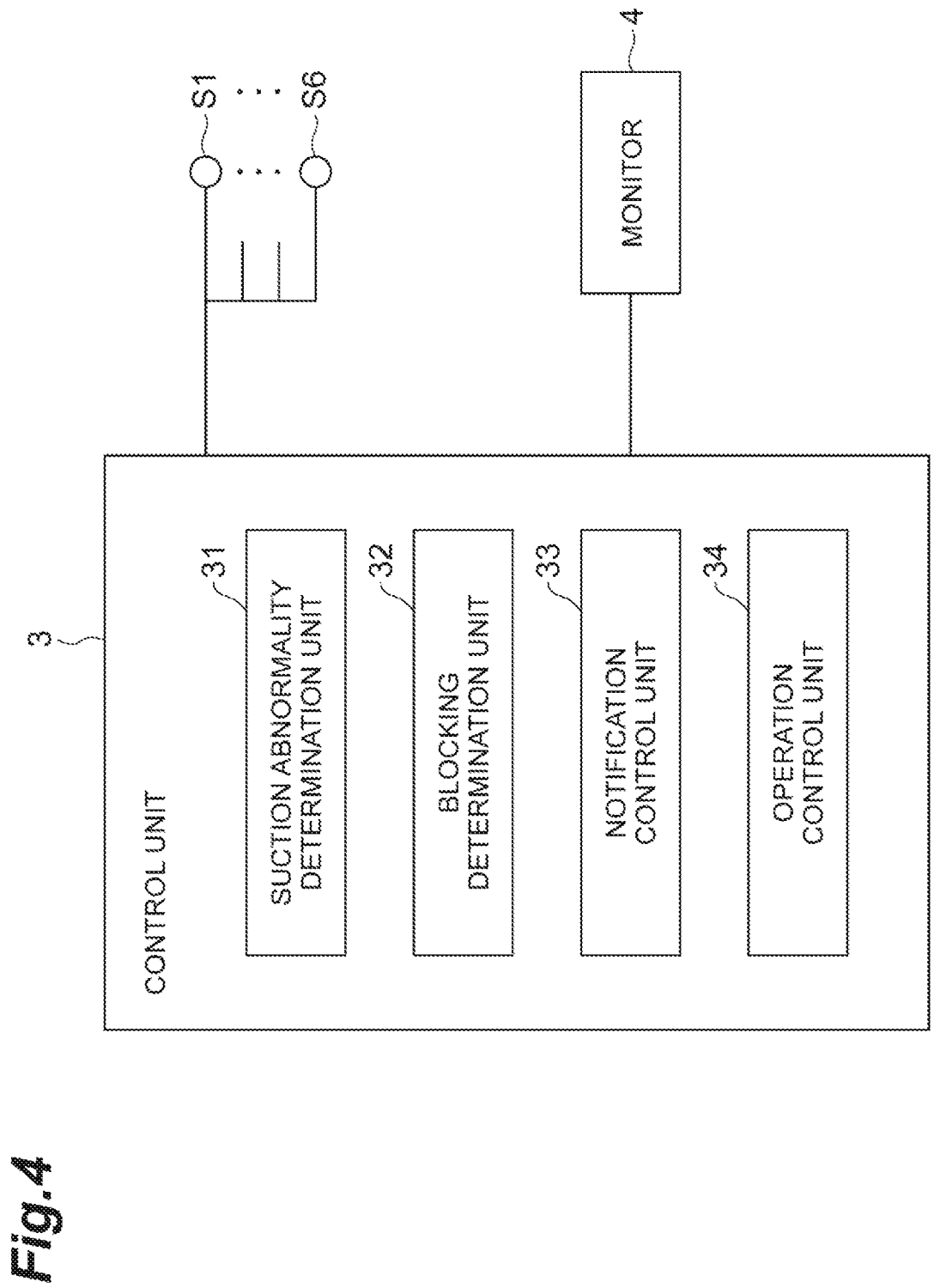
FIG. 4 is a block diagram illustrating the configuration of a control unit.

As illustrated in FIG. 4, the control unit 3 functionally includes a suction abnormality determination unit 31, a blocking determination unit 32, a notification control unit 33, and an operation control unit (suction control unit) 34. The suction abnormality determination unit 31 determines the presence/absence of abnormalities of the negative pressure sources E1 to E6, respectively, on the basis of the negative pressure values detected by the negative pressure sensors S1 to S6. More specifically, the suction abnormality determination unit 31 determines that the suction unit B1 is abnormal in a case where the negative pressure value detected by the negative pressure sensor S1 whenever the suction unit B1 suctions the merchandise M (whenever the merchandise M is transferred to the box W by the transfer mechanism 2) is lower in negative pressure degree than a predetermined suction determination negative pressure value continuously by a predetermined number of times of determination or more.

In addition, in the present specification, the negative pressure value is a pressure value represented by a gauge pressure, and is a negative value. The suction determination negative pressure value is also represented by a negative value. Additionally, a case where the negative pressure degree is low is a case where the negative pressure value is close to zero compared to a case where the negative pressure degree is high. That is, a case where the detected negative pressure value is lower in negative pressure degree than the suction determination negative pressure value is a case where the detected negative pressure value is closer to zero than the suction determination negative pressure value.

For example, in a case where there is no degradation or the like in the suction unit B1, the suction port of the suction unit B1 can abut against the surface of the merchandise M without a gap when the suction unit B1 is pressed against the merchandise M. Accordingly, when the negative pressure source E1 generates a negative pressure, the negative pressure degree in the suction unit B1 becomes high. That is, the suction unit B1 can suction and hold the merchandise M normally.

On the other hand, in a case where there is degradation or the like in the suction unit B1, the suction port of the suction unit B1 cannot be brought into close contact with the surface of the merchandise M when the suction unit B1 is pressed against the merchandise M, and a gap is generated between the suction port of the suction unit B1 and the surface of the merchandise M. Accordingly, when the negative pressure source E1 generates a negative pressure, air flows into the suction unit B1 from the gap between the suction port of the suction unit B1 and the surface of the merchandise M, and the negative pressure degree in the suction unit B1 does not become high. That is, the suction unit B1 cannot suction and hold the merchandise M normally.

In addition, a preset suction determination negative pressure value used for the determination is set in advance so that whether or not the merchandise M can be normally suctioned and held by the suction unit B1 can be determined. The predetermined number of times of determination used for the determination is appropriately set so that the presence/absence of an abnormality of the suction unit B1 can be determined without an error.

Additionally, similarly to determination of the presence/absence of the abnormality of the suction unit B1, the suction abnormality determination unit 31 determines the presence/absence of an abnormality of each of the suction units B2 to B6 on the basis of the negative pressure values detected by the negative pressure sensors S2 to S6. In this way, the suction abnormality determination unit 31 can determine the presence/absence of the abnormalities of the suction units B1 to B6 individually on the basis of detection results of the negative pressure sensors S1 to S6.

The blocking determination unit 32 determines the presence/absence of the supply blocking of the negative pressure for suctioning and holding the merchandise M in the suction units B1 to B6. The blocking determination unit 32 determines the presence/absence of the supply blocking of the negative pressure for each of the suction units B1 to B6. The supply blocking of the negative pressure may occur, for example, as foreign matter blocks suction ports of the suction units B1 to B6 (at least some of the suction port are blocked). The supply blocking of the negative pressure may be a completely blocked state or may be in a partially blocked state. A case where the supply blocking of the negative pressure for suctioning and holding the merchandise M has occurred is a case where a suction force with appropriate intensity cannot be generated in the suction port of the suction unit B1 or the like because the supply blocking of the negative pressure has occurred.

The blocking determination unit 32 determines the presence/absence of the supply blocking of the negative pressure in a state where the negative pressure sources E1 to E6 generate the negative pressure for suctioning and holding the merchandise M and in a state where the suction units B1 to B6 do not suction the merchandise M (a state where the suction units B1 to B6 are not pressed against the merchandise M). For example, the blocking determination unit 32 can determine the presence/absence of the supply blocking of the negative pressure before the start of the operation of packing the merchandise M by the transfer mechanism 2.

Specifically, the negative pressure sensors S1 to S6 detect negative pressure values in a non-suctioned state of the merchandise M when the blocking determination unit 32 performs the processing of determining the presence/absence of the supply blocking of the negative pressure. The negative pressure values in the non-suctioned state of the merchandise M are negative pressure values in a state where the negative pressure sources E1 to E6 generate the negative pressure for suctioning and holding the merchandise M and the suction units B1 to B6 do not suction the merchandise M (in a state where the suction units are not pressed against the merchandise M).

The blocking determination unit 32 determines that the supply blocking of the negative pressure for suctioning and holding the merchandise M with the suction unit B1 is present in a case where the negative pressure value in the non-suctioned merchandise state detected by the negative pressure sensor S1 is higher in negative pressure degree than a predetermined blocking determination negative pressure value. Similarly, the blocking determination unit 32 determines the presence/absence of the supply blocking of the negative pressure for suctioning and holding the merchandise M with the suction units B2 to B6 on the basis of the negative pressure values in the non-suctioned merchandise state detected by the negative pressure sensors S2 to S6.

In this way, on the basis of the detection results of the negative pressure sensors S1 to S6, the blocking determination unit 32 can individually determine which system of the suction units B1 to B6 the supply blocking of the negative pressure has occurred in.

In addition, the blocking determination negative pressure values are lower in negative pressure degree than the suction determination negative pressure value. Accordingly, the blocking determination unit 32 can more appropriately determine the supply blocking of the negative pressure on the basis of the negative pressure values in the non-suctioned merchandise state.

The notification control unit 33 causes a suction unit abnormality display, indicating that an abnormality has occurred, to be displayed on the monitor 4 in a case where at least one of the suction units B1 to B6 is determined to be abnormal by the suction abnormality determination unit 31. The notification control unit 33 can cause the suction unit abnormality display to be displayed on the monitor 4 so that the operator can ascertain which suction unit B1 to B6 an abnormality has occurred in. In this way, the notification control unit 33 and the monitor 4 function as a notification unit that provides a notification in a case where the suction units B1 to B6 are determined to be abnormal.

Additionally, the notification control unit 33 causes a negative pressure blocking display, indicating that the supply blocking of the negative pressure has occurred, to be displayed on the monitor 4 in a case where the blocking determination unit 32 determines that there is the supply blocking of the negative pressure. The notification control unit 33 can cause the negative pressure blocking display to be displayed on the monitor 4 so that the operator can ascertain which suction unit (which system) of the suction units B1 to B6 the supply blocking of the negative pressure for suctioning and holding the merchandise M has occurred in. In this way, the notification control unit 33 and the monitor 4 function as the notification unit that provides a notification in a case where the supply blocking of the negative pressure is determined to be present.

The operation control unit 34 controls the servo mechanism 23, and moves and rotates the transfer head 21 three-dimensionally. Additionally, the operation control unit 34 controls the operation of suctioning and holding the merchandise M in the suction units B1 to B6 by controlling the operation of generating the negative pressure in the negative pressure sources E1 to E6. The operation control unit 34 stops the operation of packing the merchandise M in the transfer mechanism 2 in a case where the number of the suction units B1 to B6, which are determined to be abnormal by the suction abnormality determination unit 31, is equal to or more than a predetermined number of abnormality determinations. That is, the operation control unit 34 stops the suctioning and holding operation in the suction units B1 to B6.

As described above, the boxing apparatus 1 determines the presence/absence of the abnormality of the suction unit B1 or the like on the basis of the negative pressure value detected in the negative pressure sensor S1 or the like. Here, if abnormalities, such as degradation, occur in the suction units B1 to B6, the suction port of the suction unit B1 or the like cannot be appropriately brought into close contact with the merchandise M, and the negative pressure degree in the suction unit B1 or the like does not become high due to leakage of air. For this reason, the boxing apparatus 1 can determine the presence/absence of the abnormalities of the suction units B1 to B6, respectively, by using the detection results of the negative pressure sensors S1 to S6.

Additionally, the suction abnormality determination unit 31 of the boxing apparatus 1 determines that the suction units B1 to B6 are abnormal in a case where the negative pressure values detected by the negative pressure sensors S1 to S6 are lower in negative pressure degree than the suction determination negative pressure value continuously by a predetermined number of times of determination or more. Accordingly, the suction abnormality determination unit 31 can suppress that the suction units B1 to B6 are erroneously determined to be abnormal in a case where the suction units B1 to B6 cannot suction the merchandise M appropriately by chance due to causes other than the abnormality of the suction units B1 to B6. In this way, the boxing apparatus 1 can determine the abnormalities of the suction units B1 to B6 appropriately. Also, the operator of the boxing apparatus 1 can ascertain the abnormalities of the suction units B1 to B6 on the basis of the suction unit abnormality display displayed on the monitor 4.

Here, the suction units B1 to B6 are constituted of members, such as elastically deformable resin. Although such a suction unit B1 or the like degrades with elapse of time, the degree of the degradation varies greatly due to environment, frequency, and the like where the suction unit B1 or the like is used. Additionally, there is a case where it is difficult to determine the degree of degradation of the suction unit B1 or the like from the appearance of the suction unit B1 or the like. For example, if the suction units B1 to B6 are replaced all at once in a predetermined replacement cycle, even a suction unit in which an abnormality does not occur and replacement is originally unnecessary will be replaced. In contrast, the boxing apparatus 1 can determine the abnormalities of the suction units B1 to B6 individually on the basis of the detection results of the negative pressure sensors S1 to S6, and can provide a notification. Accordingly, the operator can replace only a suction unit in which an abnormality has occurred.

The operation control unit 34 stops the operation of packing the merchandise M in the transfer mechanism 2 in a case where the number of the suction units B1 to B6, which are determined to be abnormal by the suction abnormality determination unit 31, is equal to or more than the number of abnormality determinations. Accordingly, the boxing apparatus 1 can stop the operation of packing the merchandise M in a case where the number of the suction units B1 to B6, which are determined to be abnormal, is equal to or more than the number of abnormality determinations and the merchandise M cannot be appropriately suctioned and held by the suction units B1 to B6. Therefore, the boxing apparatus 1 can previously prevent problems caused by the fact that the merchandise M cannot be appropriately suctioned and held by the suction units B1 to B6 such that the merchandise M falls during the operation of packing the merchandise M.

The blocking determination unit 32 can determine the supply blocking of the negative pressure on the basis of the negative pressure values in the non-suctioned merchandise state detected by the negative pressure sensors S1 to S6. Also, the operator of the boxing apparatus 1 can ascertain the supply blocking of the negative pressure on the basis of the negative pressure blocking display displayed on the monitor 4.

Additionally, the determination of the supply blocking of the negative pressure in the blocking determination unit 32 can be performed before the start of the operation of packing the merchandise M in the transfer mechanism 2. Also, in a case where the blocking determination unit 32 determines that the supply blocking of the negative pressure is not present, the operation of packing the merchandise M in the transfer mechanism 2 can be started. In a case where the negative pressure degree in the suction unit B1 or the like does not become high in the suctioning and holding operation although the supply blocking of the negative pressure is determined not to be present, the possibility that occurrence of degradation or the like in the suction unit B1 or the like is a cause is high. For this reason, as the suction abnormality determination unit 31 determines the presence/absence of the abnormality of the suction unit B1 or the like after the supply blocking of the negative pressure is previously determined not to be present, the reliability of determination of the presence/absence of the abnormality of the suction unit B1 or the like can be improved.

Although the embodiment of the present disclosure has described above, the present disclosure is not limited to the above embodiment. For example, although the transfer head 21 is provided with a total of six suction units B1 to B6, the number of suction units provided in the transfer head 21 is not limited to six.

The boxing apparatus 1 can include a sound output unit, such as a loudspeaker that outputs sound instead of or in addition to the monitor 4. In this case, the notification control unit 33 causes a suction unit abnormality notification sound, indicating that an abnormality has occurred, to be output from the sound output unit in a case where at least any of the suction units B1 to B6 is determined to be abnormal by the suction abnormality determination unit 31. In this way, the notification control unit 33 and the sound output unit function as the notification unit that provides a notification in a case where the suction units B1 to B6 are determined to be abnormal. Additionally, the notification control unit 33 causes a negative pressure blocking notification sound, indicating that the supply blocking of the negative pressure has occurred, to be output from the sound output unit in a case where the blocking determination unit 32 determines that the supply blocking of the negative pressure is present. In this way, the notification control unit 33 and the sound output unit function as the notification unit that provides a notification in a case where the supply blocking of the negative pressure is determined to be present.

In addition, the boxing apparatus 1 can have a configuration in which the packing operation in the transfer mechanism 2 is not stopped even in a case where the number of the suction units B1 to B6, which are determined to be abnormal, is more than the number of abnormality determinations. Additionally, the boxing apparatus 1 can have a configuration in which the blocking determination unit 32 does not perform the processing of determining the supply blocking of the negative pressure.

At least some of the embodiment described above and various modification examples can be optionally combined together.

What is claimed is:

1. A suction apparatus comprising:
    a suction unit configured to suction and hold merchandise with a negative pressure;
    a negative pressure detection unit configured to detect a negative pressure value in the suction unit whenever the suction unit suctions the merchandise;
    a suction abnormality determination unit configured to determine that the suction unit is abnormal in a case where the detected negative pressure value is lower in negative pressure degree than a standard value, and presence of an abnormality is determined for the suction unit consecutively a predetermined number of times;
    a notification unit configured to provide a notification in a case where the suction unit is determined to be abnormal; and
    a suction control unit configured to control an operation of suctioning and holding the merchandise in the suction unit,
    wherein the standard value is a predetermined suction determination negative pressure value,
    the suction unit includes a plurality of suction units,
    the negative pressure detection unit detects negative pressure values in the plurality of suction units, respectively,
    the suction abnormality determination unit determines presence/absence of an abnormality for each of the plurality of suction units, and
    the suction control unit stops the suctioning and holding operation in the suction unit in a case where a number of the suction units that are determined to be abnormal by the suction abnormality determination unit is equal to or more than a predetermined number of abnormality determinations.

2. The suction apparatus according to claim 1, further comprising:
    a blocking determination unit configured to determine presence/absence of a supply blocking of a negative pressure for suctioning and holding the merchandise with each of the plurality of suction units,
    wherein the negative pressure detection unit detects the negative pressure value in a non-suctioned state of the merchandise in each of the plurality of suction units in a state where a negative pressure source connected to each of the plurality of suction units generates the negative pressure for suctioning and holding the merchandise and each of the plurality of suction units does not suction the merchandise,
    the blocking determination unit determines that the supply blocking of the negative pressure is present in a case where the detected negative pressure value in a non-suctioned state of the merchandise is higher in negative pressure degree than a predetermined blocking determination negative pressure value, and
    the notification unit provides a notification in a case where the supply blocking of the negative pressure is determined to be present.

3. The suction apparatus according to claim 1, wherein the notification unit is further configured to cause information concerning the suction unit abnormality to be displayed.

4. The suction apparatus according to claim 1, wherein the suction abnormality determination unit is further configured to determine that each of the plurality of the suction units is not abnormal in a case where presence of an abnormality is not determined for the each of the plurality of the suction units consecutively a predetermined number of times.

5. The suction apparatus according to claim 1, further comprising:
    a plurality of negative pressure sources configured to generate the negative pressure, each of the plurality of negative pressure sources being connected to each of the plurality of suction units.

* * * * *